United States Patent [19]
Yoshio et al.

[11] Patent Number: 5,446,714
[45] Date of Patent: Aug. 29, 1995

[54] DISC CHANGER AND PLAYER THAT READS AND STORES PROGRAM DATA OF ALL DISCS PRIOR TO REPRODUCTION AND METHOD OF REPRODUCING MUSIC ON THE SAME

[75] Inventors: Junichi Yoshio; Yukio Taniai; Munetoshi Moriichi, all of Tokorozawa, Japan

[73] Assignee: Pioneer Electronic Corporation, Tokyo, Japan

[21] Appl. No.: 91,881

[22] Filed: Jul. 15, 1993

[30] Foreign Application Priority Data

Jul. 21, 1992 [JP] Japan .................. 4-193823
Jul. 21, 1992 [JP] Japan .................. 4-193824
Jul. 21, 1992 [JP] Japan .................. 4-193825

[51] Int. Cl.⁶ ............................................ G11B 7/00
[52] U.S. Cl. ........................................ 369/48; 369/32; 369/36; 369/50; 369/58; 358/342
[58] Field of Search ................ 369/47, 48, 32, 33, 369/36, 30, 50, 54, 58, 49; 358/342, 343, 341; 84/609, 601, 602, 603

[56] References Cited

U.S. PATENT DOCUMENTS

| | | | |
|---|---|---|---|
| 4,796,099 | 1/1989 | Compton | 358/342 |
| 5,131,311 | 7/1992 | Murakami et al. | 84/609 |
| 5,157,643 | 10/1992 | Suzuki | 369/33 |
| 5,157,646 | 10/1992 | Amemiya et al. | 369/47 |
| 5,218,580 | 6/1993 | Okamura et al. | 369/2 |
| 5,228,021 | 7/1993 | Sato et al. | 369/58 |
| 5,245,600 | 9/1993 | Yamauchi et al. | 369/49 |
| 5,247,126 | 9/1993 | Okamura et al. | 84/609 |
| 5,268,889 | 12/1993 | Furukawa et al. | 369/47 |

FOREIGN PATENT DOCUMENTS 0383530 8/1990 European Pat. Off. .

*Primary Examiner*—W. R. Young
*Assistant Examiner*—Thang V. Tran
*Attorney, Agent, or Firm*—Young & Thompson

[57] ABSTRACT

The disc player accommodates a plurality of CD-I discs, to each of which program data required to reproduce information on the disc is recorded at a predetermined area thereof. The disc player has a disc changer to selectively supply each CD-I disc to a reproducing unit. The method of reproducing information of the disc player includes the steps of: reading the program data from the CD-I disc, and writing the read program data into a memory, with respect to all of the CD-I discs accommodated in the disc changer; and performing a reproduction operation with reference to the program data written in the memory at the time of the reproduction operation of the information on the CD-I disc.

7 Claims, 6 Drawing Sheets

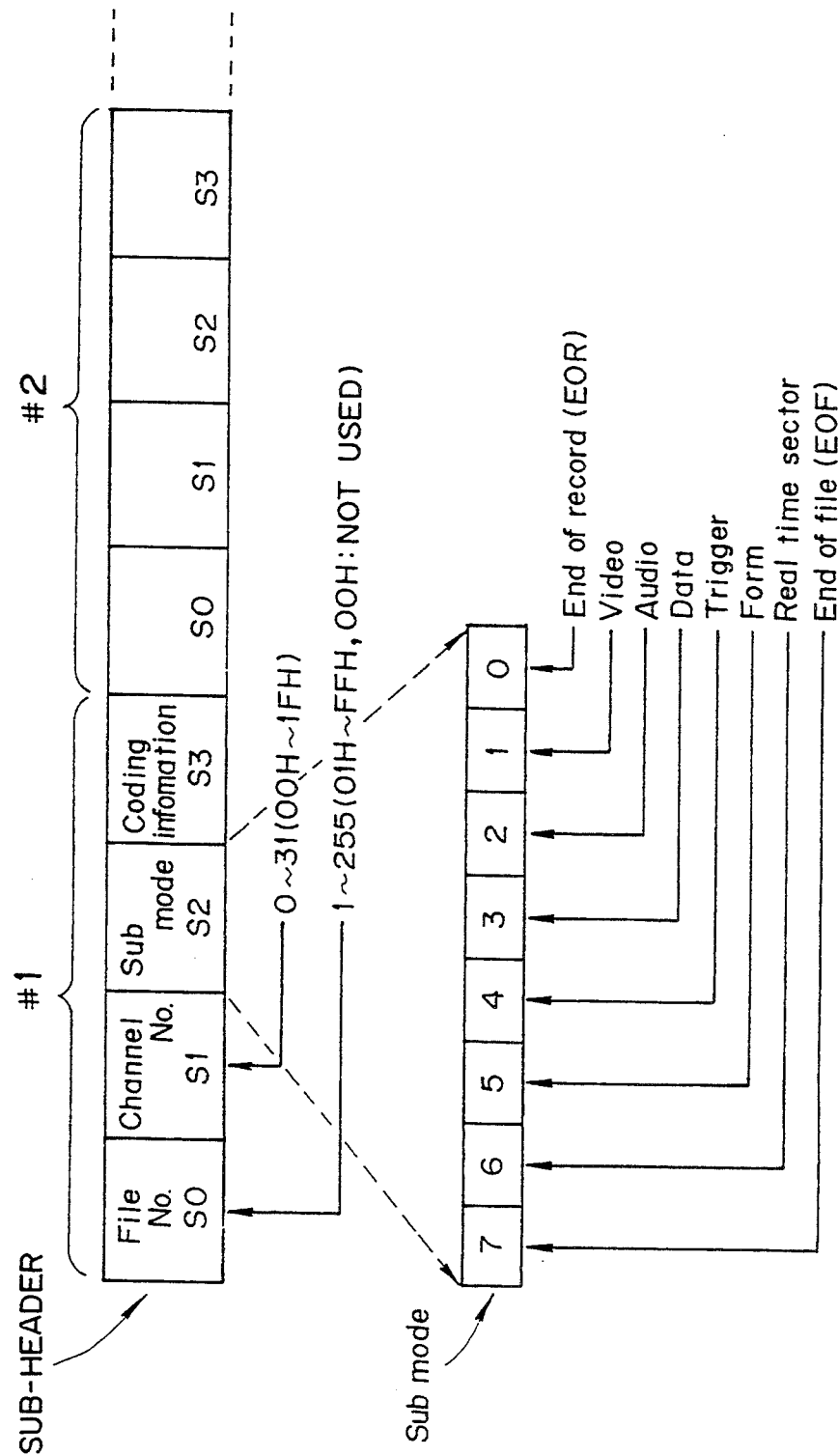
FIG. 6 DATA FORMAT OF SUB-HEADER

DISC CHANGER AND PLAYER THAT READS AND STORES PROGRAM DATA OF ALL DISCS PRIOR TO REPRODUCTION AND METHOD OF REPRODUCING MUSIC ON THE SAME

BACKGROUND OF THE INVENTION

1. Field of the Invention

The present invention is related to a disc player and a method of reproducing information of the disc player.

More particularly, the present invention is related to a controlling method of a music accompaniment playing apparatus, which has a disc changer accommodating two or more CD-I (Compact Disc-Interactive) discs, on which "karaoke" (music accompaniment play) music is recorded by the CD-I format.

The present invention is also related to an improvement of the music accompaniment playing apparatus using a disc changer which accommodates many CD-Gs (CD graphics).

The present invention is further related to an improvement of displaying a title name of the music in the music accompaniment playing apparatus, which uses the disc changer accommodating the CD-G and the CD-I.

2. Description of the Related Art

A music accompaniment playing system is adapted to display words on a display device with a music accompaniment playing sound. Besides the music accompaniment playing apparatus using a LD (Laser Disc), which reproduces an animation as a BGV (Back Ground Video: background image), there is a music accompaniment playing apparatus by use of the CD-G (CD-Graphics). The graphics data is kept by the compact format in the CD-G.

The CD-G type music accompaniment playing apparatus as well as the LD music accompaniment playing apparatus, has a CD changer for storing or accommodating many CD-Gs. For example, about 300 discs of CD-Gs are accommodated in the CD changer. If it is converted into the number of songs, it is equivalent to about 3,000 songs. In the CD-G, word information is recorded as graphics data together with audio information of the music of the music accompaniment play. At the time of reproduction, this graphics data is reproduced with the audio information, and the character display of it is carried out on a picture plane of a TV monitor. A CD-G type music accompaniment playing apparatus is generally used while it is interlocked with the LD player prepared independently, and is adapted to superimpose the graphics data to the animation BGV data supplied from the LD player to display it at the time of reproduction.

In the above mentioned disc player and the reproducing method thereof, there is a first problem as follows.

Namely, according to the CD-I, the program for operating a CPU (Central Processor Unit) is stored on the disc itself. The disc system of a dialog type is built under a predetermined OS (Operating System) environment. The start address of the data built in the disc, the sequence about the control of the operation, etc. are described in this program.

It is possible to provide a music accompaniment playing system in the same manner as the conventional CD-G disc, by constructing the music data and the graphics data by use of the ADPCM (Adaptive Delta Pulse Code Modulation), as the data of such a CD-I disc.

However, in order to perform the performance operation by the CD-I disc, it needs to load in advance the program recorded in the disc, for each disc i.e. each time when the selected one disc is to be reproduced, so that, as the time for loading this, it is necessary about 30 seconds, including the time required for the loading operation of the disc, and for locking various servo-operations.

If such a CD-I disc is applied to the changer system, which stores about 300 discs, for example, it becomes necessary to load the program data for every operation of exchanging the discs. Thus, in order to shift to the next music, the waiting time for about 30 seconds is required, which becomes a serious problem when adapting it to the music accompaniment playing system, which is the first problem.

Further, in the aforementioned disc player and the reproducing method thereof, there is a second problem as follows.

Namely, the conventional CD-G type music accompaniment playing apparatus does not have a function which displays a music title in advance of the reproduction of the music. Generally, the music title to be reproduced is displayed on the picture plane of the TV monitor as the graphics data with a performance of the introductory Section (so-called introduction portion) for every song. In other words, the music title cannot be checked, until the reproduction has actually begun.

As a result, when the operator of the music accompaniment playing apparatus does operation mistakes, such as a music title input mistake, he notices it after a performance of the music actually starts. Furthers, there occurs a problem that One man has selected one music and another man selects the same music in succession.

Therefore, it may be proposed to employ a CD-I (CD-Interactive) as a disc which can record a music title data, in addition to the program information Of the music accompaniment play. The CD-I is adapted to record various kinds of program data other than the music data compressed by the ADPCM (Adaptive Delta Pulse Code Modulation).

However, it is not economically appropriate to exchange all of the existing CD-Gs installed in the widespread CD-G type music accompaniment playing apparatuses, to the CD-Is, resulting that the burden of the supplier of the music accompaniment playing discs as well as the user of the apparatus would be enormous, which is the second problem.

Further, in the aforementioned disc player and the reproducing method thereof, there is a third problem as follows.

Namely, since the conventional CD-G type music accompaniment playing apparatus does not have a function which displays a music title in advance of the reproduction of the music, and since the music title is displayed on the picture plane of the TV monitor with a performance of the introductory section for every song, when the reservations for a large number of desired musics of music accompaniment play are inputted, each music is continuously reproduced in the order of the input, according to the conventional technique, so that, the music title cannot be checked i.e. which music is nextly reproduced, until the reproduction is actually begun. This brings a problem that the preparation to sing must be done after starting the introduction portion of the music specified by the operator.

SUMMARY OF THE INVENTION

It is therefore an object of the present invention to provide a disc player and a method of reproducing the information of the disc player, which makes it possible to access speedily a program required for the reproduction, at the time of an information reproducing operation accompanied by an exchanging operation of the CD-I discs.

It is another object of the present invention to provide a disc player and a method of reproducing information of the disc player, which can carry out the picture plane display of the program information name, such as a music title, in advance of the reproduction of the program information, while promoting an effective use of the existing discs.

It is another object of the present invention to provide a disc player and a method of reproducing information of the disc player, which can display the program information names, such as a title name of music etc., in precedence during the reproduction of the preceding program information in case that a plurality of pieces of program information, such as musics of music accompaniment play, are continuously reproduced, while promoting an effective practical use of the existing discs.

According to the present invention, the above object can be achieved by a first information reproducing method and a first disc player of the present invention.

In the first method, the information of a disc player accommodating a plurality of CD-I discs, to each of which program data required to reproduce information on the disc is recorded at a predetermined area thereof, is reproduced. The disc player has a disc changer to selectively supply each CD-I disc to a reproducing unit. The first method includes the steps of: reading the program data from the CD-I disc, and writing the read program data into a memory, with respect to all of the CD-I discs accommodated in the disc changer; and performing a reproduction operation with reference to the program data written in the memory at the time of the reproduction operation of the information on the CD-I disc.

The first disc player includes: a reproducing unit for reproducing information recorded on a CD-I disc, to which program data required to reproduce the information is also recorded at a predetermined area thereof; a disc changer for accommodating a plurality of CD-I discs and selectively supply each CD-I disc to the reproducing unit; a memory for storing the program data; and a controller for controlling the reproducing unit to read the program data from the CD-I disc and writing the read program data into the memory, With respect to all of the CD-I discs accommodated in the disc changer, and for performing a reproduction operation of the reproducing unit with reference to the program data written in the memory at the time of the reproduction operation of the information on the CD-I disc.

According to the first method and the first disc player of the present invention, the program data of all CD-I discs in the disc changer is read prior to the reproduction of the CD-I disc. And, this read program data is written into the memory. Subsequently, at the time of reproducing the CD-I disc which is supplied to the reproducing unit from the disc changer, the required program data is read from the memory. Then, the reproduction operation is performed with reference to this read program data.

In this manner, since the program data of each CD-I disc is transferred to memory in advance, it is not necessary to read the program data from the CD-I disc for each CD-I disc upon reproducing, and thus, it is possible to increase the speed of accessing the program data accompanied by the disc exchange, according to the first method and the first disc player of the present invention.

According to the present invention, the above object can be also achieved by a second information reproducing method and a second disc player of the present invention.

In the second method, the information of a disc player, is reproduced. The disc player accommodates a plurality of first format discs, each of which stores program information by a first format, and at least one second format disc, which stores program information name data of each of the first format discs by a second format different from the first format, and reproduces the program information. The second method includes the steps of: reading the program information name data from the second format disc and storing the program information name data into a memory; selecting one of the first format discs to be reproduced; and displaying the program information name data corresponding to the selected first format disc before reproducing the program information of the selected first format disc.

The second disc player includes: a plurality of first format discs, each of which stores program information by a first format; at least one second format disc, which stores program information name data of each of the first format discs by a second format different from the first format; a reproducing unit for selecting one of the first format discs and reproducing the program information of the selected first format disc; a memory for storing the program information name data; a displaying device for displaying a program information name; and a controlling device for reading the program information name data from the second format disc, storing it to the memory, and transferring the program information name data corresponding to the selected first format disc to the displaying device before the reproducing unit reproduces the program information of the selected first format disc.

Namely, according to one aspect of the present invention, the second disc player records the music title data of accompaniment play in the CD-G format, which is the first format disc, onto the CD-I, which is the second format disc, and it reads out the music title data from the CD-I at the time of installation of the music accompaniment playing apparatus etc. to store thus read music title data to the memory. Then, each time of reproducing the CD-G, it reads the corresponding music title of the music from the memory, and displays it on the picture plane of the TV monitor.

According to the second method and the second disc player of the present invention, the second format disc, on which each program information name data of a plurality of first format discs are collectively recorded, is prepared. From this second format disc, the program information name data is stored to the memory under the control at the time of installation etc. of the music accompaniment playing apparatus. And, in advance of the reproduction of the program information, the program information name data can be displayed on the displaying device.

Therefore, it is not necessary to replace all of the first format discs by the second format disc, but just by employing the second format disc of 1 disc or several discs, it is possible to operate the existing system with a function to display the program information name, according to the second method and the second disc player of the present invention.

According to the present invention, the above object can be also achieved by a third disc player and a third method of reproducing information of the disc player of the present invention.

In the third method, the information of a disc player for selecting one of a plurality of recording discs and reproducing program information included in the selected recording disc, is reproduced. The third method includes the steps of: reproducing one program information; and displaying an information title name of another program information to be nextly reproduced after said one program information, on a displaying device, at a predetermined time during a reproduction of said one program information.

The third disc player includes: a reproducing unit for selecting one of a plurality of recording discs and reproducing one program information included in the selected recording disc; a memory for storing an information title name of the program information of each of the recording discs; and a displaying device for displaying the information title name of another program information to be nextly reproduced after one program information at a predetermined time during a reproduction of one program information.

Namely, in case that a plurality of musics of music accompaniment play, are continuously reproduced, the present invention is adapted to display the title name of the music which is to be nextly reproduced, on a picture plane of a TV monitor during the reproduction of the preceding music at a predetermined time before the end, for example, according to one aspect of the present invention.

According to the third method and the third disc player of the present invention, at the predetermined time during the reproduction of one program information, for example, at the time just before the reproduction end of the program information etc., the information title name of another program information which is to be nextly reproduced, is displayed on the displaying means. Thereby, it becomes possible to know beforehand which program information will be nextly reproduced. For example, when the present invention is applied to the music accompaniment playing apparatus, it becomes possible to know beforehand that the music selected by the operator will be nextly reproduced during the reproduction of the preceding music.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a diagram in which an example of data format of a sub-header of the CD-I is shown.

DETAILED DESCRIPTION OF THE PREFERRED EMBODIMENTS

Nextly, the preferred embodiments of the present invention will be explained on the basis of the drawings.
First Embodiment FIG. 1 shows a music accompaniment playing apparatus as a first embodiment according to the present invention.

Figure 1:
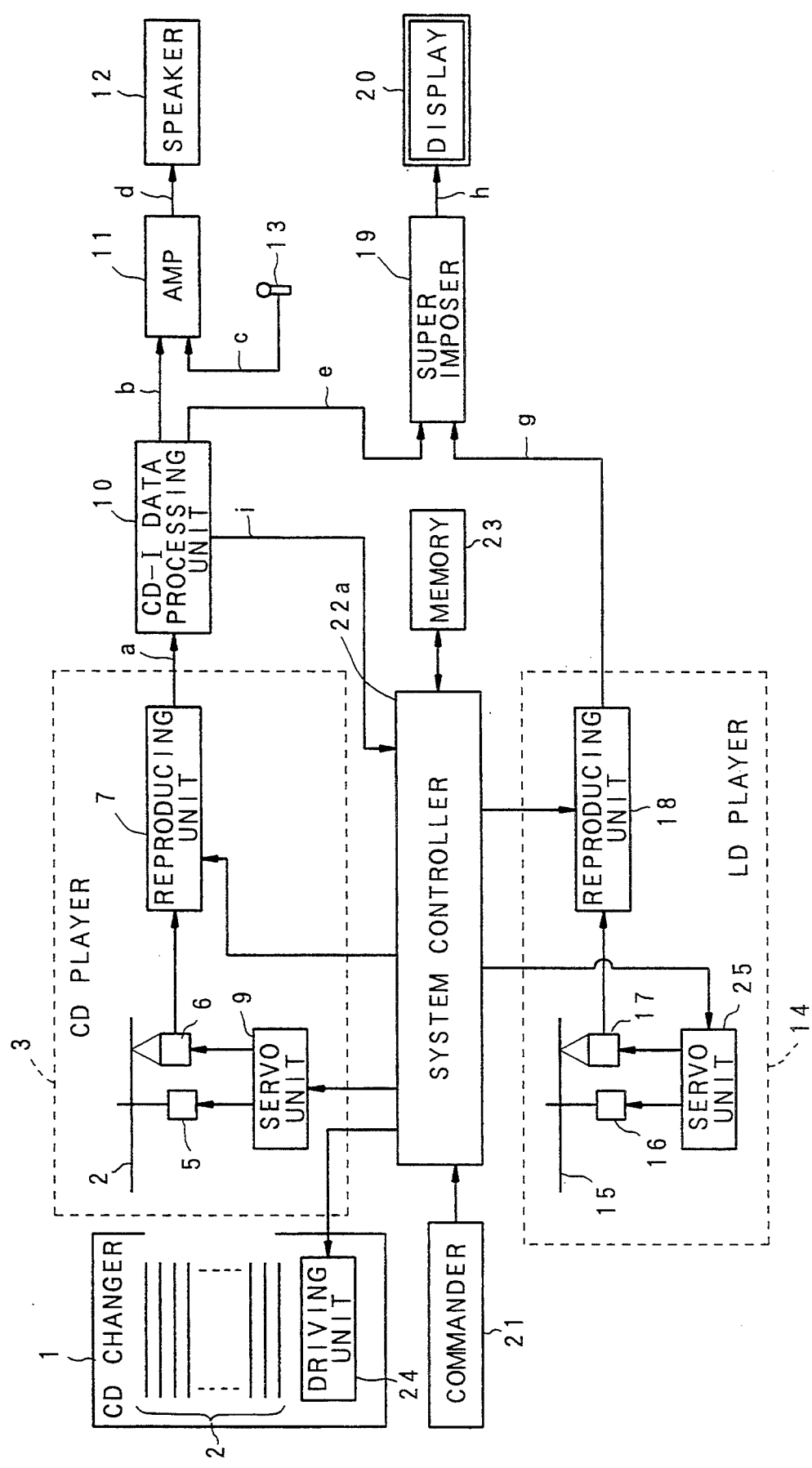
FIG. 1 is a block diagram which shows a constitution of a disc player as a first embodiment according to the present invention.

In FIG. 1, the music accompaniment playing apparatus is provided with a CD changer 1, a CD player 3, a CD-I data processing unit 10, an amplifier 11, a speaker 12, a microphone 13, a LD player 14, a superimposer 19, a display device 20, a commander 21, a system controller 22a, and a memory 23.

The CD changer 1 accommodates a plurality of CDs 2, including a CD-I disc, and is provided with a driving unit 24 for exchanging the CDs and selectively supplying one selected CD to the CD player 3 under the control of the system controller 22a.

The CD player 3 is provided with a spindle motor 5, an optical pickup 6, a reproducing unit 7 and a servo unit 9. The LD player is provided with a spindle motor 16, an optical pickup 17, a reproducing unit 18, and a servo unit 25.

Figure 2:
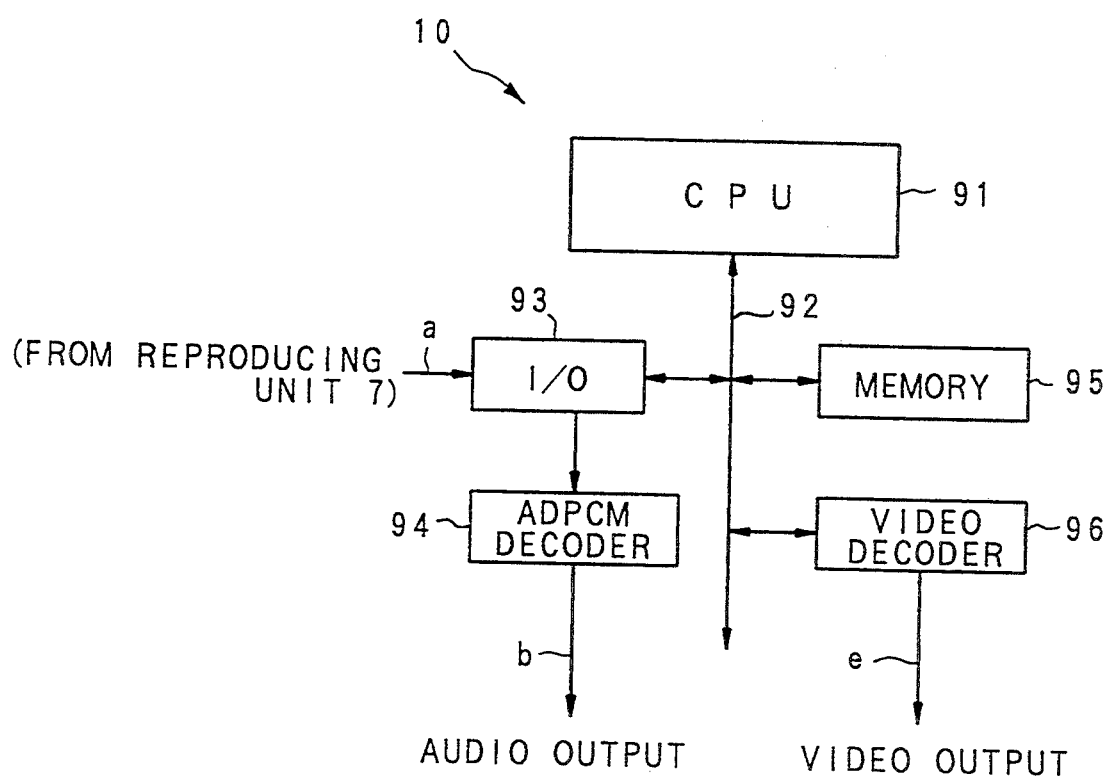
FIG. 2 is a block diagram which shows a detailed example of a CD-I data processing unit in the first embodiment of FIG. 1.

The CD-I data processing unit 10 is provided with a CPU 91 (Central Processing Unit) 91, a system bus 92, an I/O input 93, an ADPCM decoder 94, a memory 95, and a video decoder 96, as shown in FIG. 2.

Here, before explaining the detailed construction of the system, the CD-I will be explained, which is the medium used in the present invention.

In the CD-I, the logical format, the computer and OS (Operating System) for controlling it, the method of compressing the audio signal and the video signal to the digital signal, and a portion of the specification as the product, are defined in a standard, which is called by common-name of "GREEN BOOK". According to this standard, all CD-I discs have interchangeability such that they are reproducible by all CD-I players. The CD-I system is defined such that it can use various audio and video information as an interactive multi-media system by use of a computer program.

In this manner, the CD-I is the first multi-media system which is considered as a system for public use toward the application for home and educational use.

The CD-I standard is defined on the basis of the CD-ROM standard. The CD-ROM standard is defined on the basis of the CD-DA standard (which is the general audio CD standard and has a common name of "RED BOOK"). Therefore, the physical specifications, such as a disc outside size and a weight, and the optical specification, follow the RED BOOK. The data format follows the YELLOW BOOK.

The format of the CD-I is specified on the basis of the mode 2 of the CD-ROM, and is different, by addition of the sub-header and the positions of the EDC, ECC etc., from the two formats (form 1 and form 2) and the CD-ROM format.

To the sub-header, 4 bytes of a file number, a channel number, a sub-mode and a coding information, are written twice as a countermeasure of the reading error. The file number is prepared in order to recognize the block when the block belonging to the same file is interleaved. The file number is stored to the directory mentioned later, corresponding to the file name. The block of the file number belongs to one certain file.

In the data format of the CD-I, each data form of the audio and video to be recorded, and the file format which constructs these data, are as following.

Namely, the audio data is recorded by the ADPCM method. There are three levels in this method. If the tone quality is decreased, the record capacity is increased, so that prolonged reproduction is enabled. In the data compression according to this method, the data of the prediction filter and the range used at the time of the reproduction, is recorded together with the compressed data.

The video data is recorded by the compression coding method of the various still pictures. The method suitable for the kind and the usage of the original image is employed. The DYUV is suitable for natural drawings. The CLUT and the RGB555 are suitable for so-called graphics drawings. The RL is also suitable for the graphics drawings and, since its rate of compression is higher, it is applicable also to graphics animations.

As for the file format, the CD-I format employs the hierarchical structure on the basis of a root directory, under which some layers of the sub-directories are layered, and a file is further located thereunder. Each sub-directory is also treated as a file.

From the files in this hierarchical structure, the target one is sought. A pass table is provided in order to make the seeking-time short. Moreover, the distributed sub-directory structure is employed. The disc label is written to the sector, whose physical address of the disc is 2 minutes 16 seconds block, in which the contents of the disc and the logical addresses of the pass table and the root directory, are written.

The seeking operation of the CD-I is performed as follows. Firstly, the disc label is accessed, and the address of the pass table is recognized. Then, the pass table is accessed, and the contents of the pass table are stored into the RAM. The pass table is an address table on which the sub-directory is arranged in the order of the parent-and-child relation and the name. Thus, the address of the sub-directory including the target file, is identified, so that the access there is performed. From this position, the continuous reading operation is performed, and the target file is obtained.

The CD-I disc, which is constructed by the above format, is then subjected to the reproduction in the CD-I system. The CD-I system is set to the GREEN BOOK.

The GREEN BOOK prescribes as for the OS, which is called as "CD-RTOS", and is constructed on the basis of the OS-9/68000.

In this manner, it is the CD-I system, which has the computer using the OS and the large-scaled CD-ROM, and includes the compressed audio and video signal format.

Figure 3:
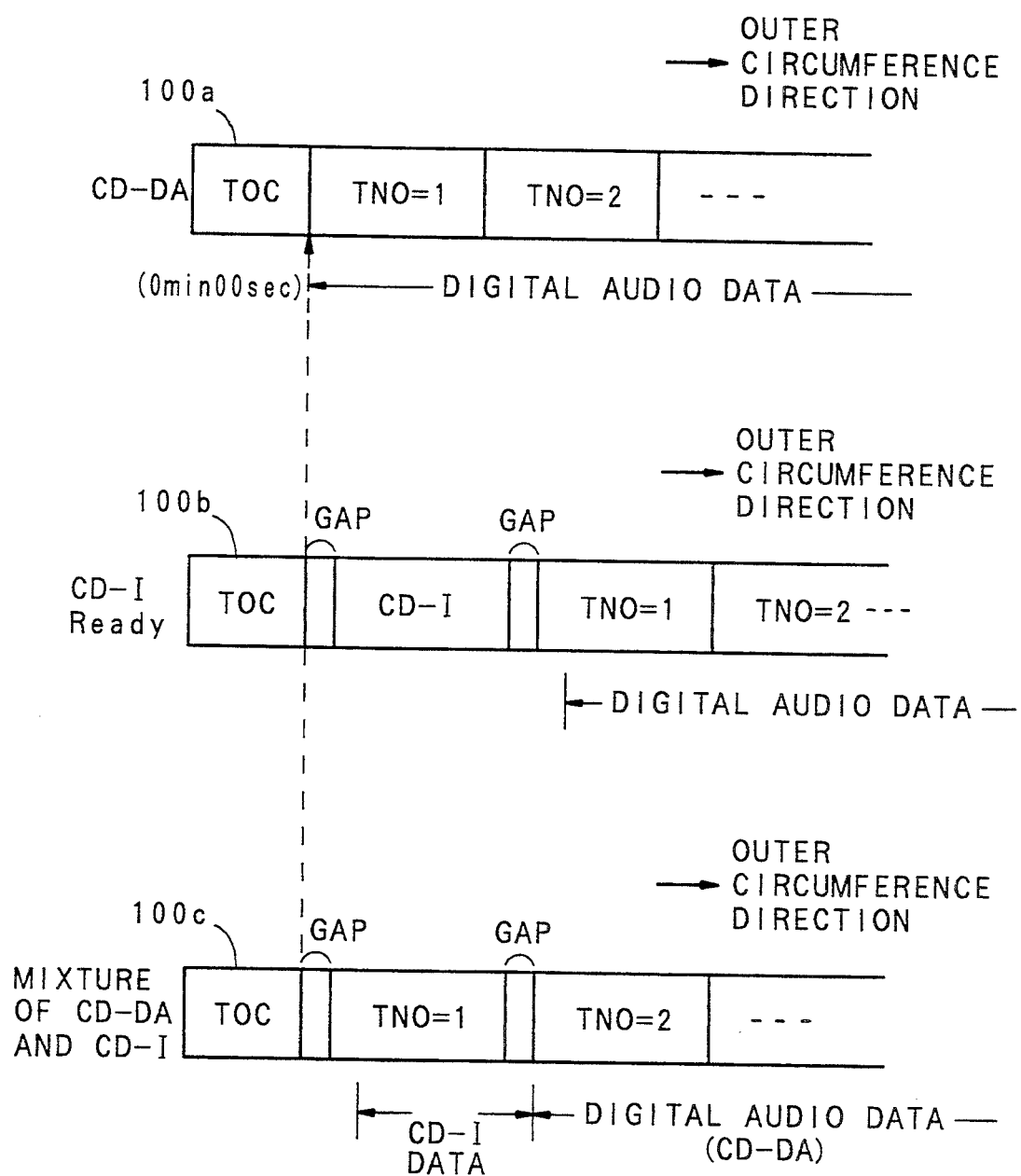
FIG. 3 is a diagram which shows an example of a disc format employed in the first embodiment of FIG. 1.

In FIG. 3, the format 100a shows an example of the format of CD-DA which is a so-called compact disc for audio, or CD-G. The format 100b shows an example of the format of CD-I Ready which is different form the formats of the CD-DA and CD-G. The format 100c shows a format which is, so to speak, a mixture of the CD-DA and the CD-I Ready, and is adapted to pseudo-function in the same manner as the CD-I Ready by recording the CD-I data at the area of TNO1 of the CD-DA. Identification of each of these discs is performed by detecting the identifying code recorded in each TOC area.

In the CD-I Ready format 100b shown in FIG. 3, there are provided a CD-I area and a FILE TOC (file track) area having a structure specialized as its application, through a gap area between the TOC area and the TNO (track number) 1. A volume descriptor VD is provided in the CD-I area. This volume descriptor VD is the description word which properly describes the contents of the information stored in the pertinent disc, and is read at the time of a reading start.

As shown in the format 100c of FIG. 3, as one form of the CD-I, for example, the TNO1 may be used as the CD-I track, and the track TNO2 and the tracks after the TNO 2 may be used as the CD-DA track.

In this manner, the CD-I Ready format 100b as a modification of the CD-I has the application program area and the data area between the TOC area situated in the lead-in area and the TNO1 in the program area, through the gap area.

The music accompaniment playing apparatus according to the present invention is constructed on the basis of the above mentioned CD-I format.

In FIG. 1, the CD changer 1 accommodates or stores a plurality of the above mentioned CD-Is 2, and is adapted to selectively load each disc one by one to the CD player 3 by the driving unit 24 in correspondence with the change command. The CD changer 1 is operated by a control command of the system controller 22a mentioned later in detail. The CD player 3 reproduces the record information of the CD-I 2 selected from the CD changer 1. Namely, for example, under a predetermined rotating condition by the spindle motor 5, the loaded CD-I 2 is optically read by the pickup 6, and the RF signal converted into the electric signal by the pickup 6 is demodulated by the reproducing unit 7. The servo unit 9 controls the number of rotations of the spindle motor 5, and the focusing and tracking controls of the pickup 6. The CD-I data processing unit 10 is connected to the output of the reproducing unit 7.

As shown in FIG. 2, the CD-I data processing unit 10 consists of a computer. By the program stored in the memory 95, the CPU 91 carries out the decoding of the CD-ROM data in the CD-I 2, performs the extraction of the data required for reproduction, and generates and outputs the audio data b and the video data e. The audio data b is sent to the amplifier 11. The video data e is sent to the superimposer 19.

The amplifier 11 combines the voice signal c from the microphone 13, and the audio signal b from the CD-I data processing unit 10, amplifies it to a predetermined power level, and outputs the composite signal d to the speaker 12.

The LD player 14 is an apparatus for supplying the BGV which runs short in the CD-I 2. For example, the BGV information edited by a music genre or other classification, is recorded in the LD 15, such that, by the technique of specifying by an operator or an automatic selection, the BGV is demodulated by the reproducing unit 18, and the BGV-data g is outputted.

The servo unit 25 controls the spindle motor 16 and the pickup 17 in the same manner as the servo unit 9. These servo units 9 and 25 are controlled by the system controller 22a.

The above video data e from the CD-I data processing unit 10 and the BGV data g from there producing unit 18, are inputted into the superimposer 19. The superimposer 19 superimposes the character information to the BGV data g, generates a video signal h, and outputs it to the display device 20. The display device 20 displays thus given video signal h, on a picture screen.

The system controller 22a performs the system control of the music accompaniment playing apparatus including the CD player 3 and the LD player 14. Namely, the system controller 22a receives the command from the commander 21, and supplies various required control signals to each units, according to the command. The memory 23 is connected to the system controller 22a.

As for the memory 23, a SRAM (Static RAM) which is battery backup type, such as a NV (Non Volatile: non-volatility) RAM, is preferred. The memory 23 is a memory for storing the information recorded in the FILE TOC area of the CD-I 2. This information recorded in the FILE TOC area includes a program data required for reproduction of the disc. It has been mentioned that this information is repeatedly read each time of reproducing each disc.

Nextly, the main operation of the music accompaniment playing apparatus of the present embodiment will be explained in the above constitution.

Firstly, at the time of installation of this music accompaniment playing apparatus, for example, if a power supply is switched on, the music accompaniment playing apparatus enters the install mode. There are various items of operation at the time of the install mode. Here, only the operations directly related to the present invention, will be explained.

When entering the install mode, under the control of the system controller 22a, the CD changer 1 loads all of the stored CD-Is 2 to the CD player 3 one after another. The CD player 3 reads the FILE TOC of the loaded CD-I 2, demodulates the read data through the reproducing unit 7, and sends it to the CD-I data processing unit 10. The CD-I data processing unit 10 decodes the program data read from the FILE TOC, which is required for the reproduction, and sends the data i to the system controller 22a. The system controller 22a writes thus sent program data i into the memory 23. The above mentioned series of operation is performed with respect to all of the CD-Is 2 in the CD changer 1, so that the program data of all of the CD-Is 2 is collected and stored in the memory 23 in advance.

Nextly, when entering the usual music accompaniment play reproduction operation mode, when the music selecting command is given to the system controller 22a by the commander 21, the system controller 22a gives the necessary control signals to each units in the system such as the disc change command to the driving unit 24 of the CD changer 1, the reproducing operation control command to the CD player 3 and the LD player 14 and so on, according to the command.

Now, it is assumed that one CD-I 2 is selected and is loaded onto the CD player 3. At this time, conventionally, it is necessary to read the program data required for the reproduction of this CD-I 2 at first according to the prior art system. However, since, in the present invention, the program data is already written in the memory 23 at the time of the installation, there is no need to read it again, so that, just by reading out the corresponding data in the memory 23, it is possible to quickly enter the reproduction operation, and thus high speed access becomes possible. The same thing can be said as for all of the discs contained in the CD changer 1.

As described above in detail, according to the first embodiment of the present invention, the program data is read out from the CD-I disc at the time of install mode etc., and the operation of writing the read out program data into the memory is performed with respect to all of the CD-I discs contained in said disc changer. The reproduction operation is performed with reference to the program data written in the memory at the time of information reproduction operation of the CD-I disc. Accordingly, it turns out that the program of each CD-I disc is transferred to memory beforehand, so that there is no need to read the program from the disc for every CD-I disc, and it is possible to make the access speedy, which is accompanied by a disc change.

Further, the initial load operation of the CD-I disc can be simplified, and when applying it to the music accompaniment play, the operation of shifting to the next music can be quickly performed.

Second Embodiment

Nextly, the second embodiment of the present invention will be explained hereinbelow with referring to FIG. 4.

Figure 4:
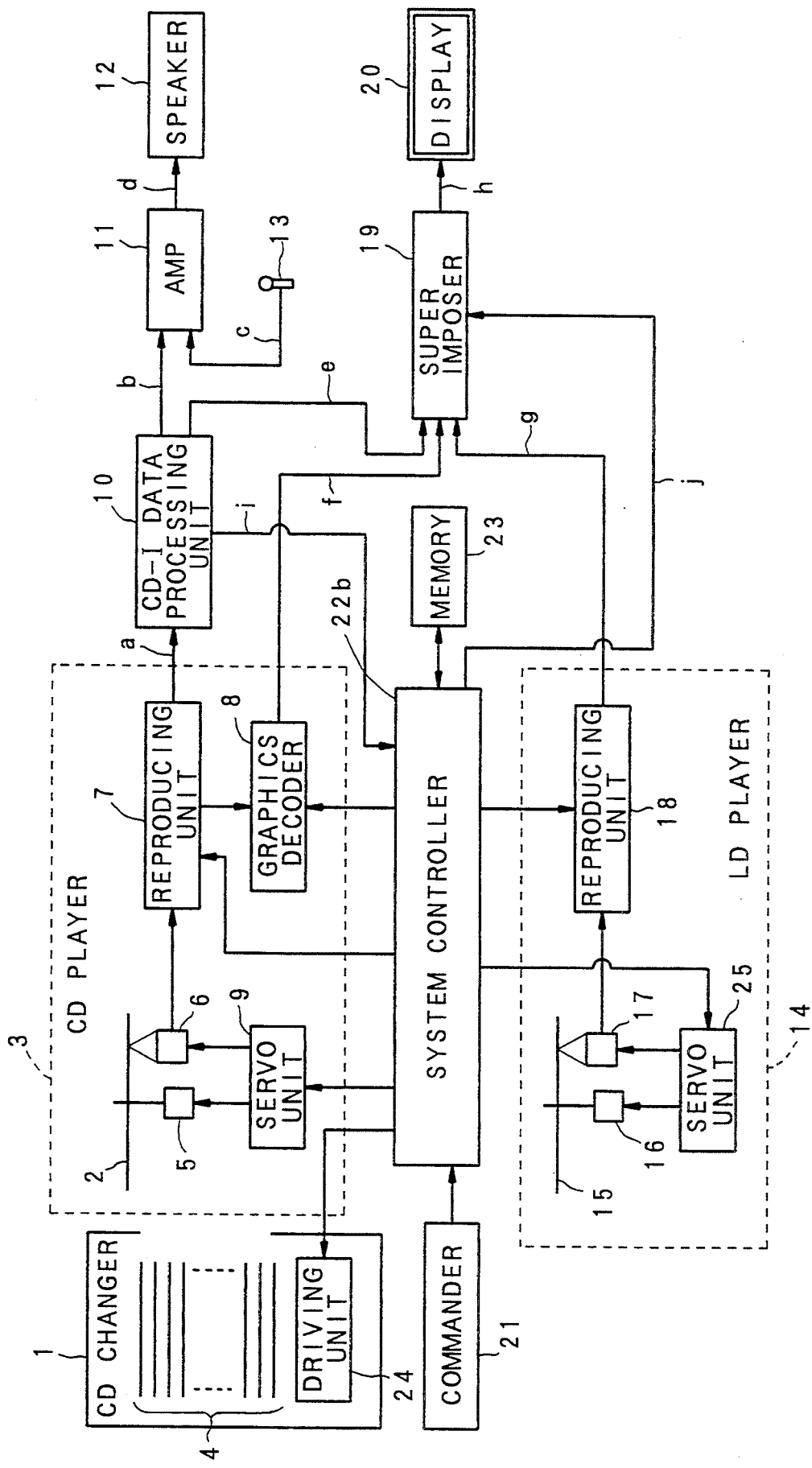
FIG. 4 is a block diagram which shows a constitution of a disc player as a second embodiment of the present invention.

FIG. 4 shows a block diagram in case of applying the present invention to a music accompaniment playing apparatus. In FIG. 4, the same constitutional elements as those in FIG. 1, carry the same reference numerals, and the detailed explanations thereof are omitted.

In FIG. 4, the music accompaniment playing apparatus is provided with a graphics decoder 8, which is controlled by a system controller 22b. A plurality of the CD-Gs 4 as well as the CD-I 2, are accommodated in the CD disc changer 1, while the CD-I 2 is loaded from the CD changer 1 to the CD player 3 in the figure.

The CD changer 1 contains a plurality of discs (for example, 300 discs), and is adapted to selectively load each disc to the CD player 3 by the driving unit 24. As one manner of storing discs, a total of 300 discs including 299 discs of the existing CD-Gs 4 and just 1 discs of a newly added/exchanged CD-I 2, are stored therein, for example.

The CD-G 4 has a format by which graphics data is recorded in the sub code (8 bits) area (R to W) of each frame, in addition to the main data which consists of the music data.

On the other hand, unlike the CD-ROM, the CD-I 2 is not restricted as for the kind of data to be recorded into the data area, but is able to record character data etc. other than audio data.

The example of this format is shown in FIG. 3, as explained before in detail. In the present embodiment, the FILE TOC prepared as the above mentioned application, is used as a storing section for the information about all CD-Gs 4 accommodated in the CD changer 1, and the music title information of the music of music accompaniment play recorded in the program area of each CD-G 4.

In FIG. 4, the CD player 3 reproduces the record information of the CD-G 4 or the CD-I 2 selected from the CD changer 1. Namely, for example, under the predetermined rotation by the spindle motor 5, the loaded CD-I 2 is optically read by the pickup 6, and the RF signal converted into the electric signal by the pickup 6, is reproduced or demodulated by the reproducing unit 7. The servo unit 9 performs the number of rotations control of the spindle motor 5, the focusing and tracking controls of the pickup 6 and so on. Since the graphics data is included in the record information in case that the disc of the reading object is CD-G 4, the graphics decoder 8 is an apparatus for decoding the graphics data, to output graphics data f, which is the result of decoding. The CD-I data processing unit 10 is connected to the output of the reproducing unit 7.

In case that the disc of the reading object is the CD-I 2, the CD-I data processing unit 10 is adapted to extract the peculiar data i.e. the volume descriptor information VD, for example, and output the music title data e. In case that the disc of the reading object is either the CD-G 4 or the CD-I 2, the CD-I data processing unit 10 is adapted to extract the audio signal therefrom and output the audio signal b to the amplifier 11. An example of a detailed constitution of the CD-I data processing unit 10 is shown in FIG. 2.

The amplifier 11 combines the voice signal c from the microphone 13, and the audio signal b from the CD-I data processing unit 10, amplifies it to a predetermined power level, and outputs the composite signal d to the speaker 12.

The LD player 14 is an apparatus for supplying the BGV which runs short in the CD-G 4. The servo units 9 and 25 are subjected to the control of the system controller 22b.

The above explained music title data e from the CD-I data processing unit 10, the graphics data f from the graphics decoder 8 and the BGV data g from the reproducing unit 18, are inputted into the superimposer 19. The superimposer 19 superimposes these character information to the BGV data g, generates the video signal h and outputs it to the display device 20. The display device 20 displays thus given video signal h on a picture screen thereof. As a display mode, there may be such examples that the graphics data f (words) is synthesized on the BGV, the music title data e is superimposed on the BGV, and the music title data e is superimposed on the BGV of one color background.

The system controller 22b performs the system control of the music accompaniment playing apparatus including the CD player 3 and the LD player 14. Namely, the system controller 22b receives the command from the commander 21, and, according to the command, it supplies various required control signals to each unit. The memory 23 is connected to the system controller 22b.

The memory 23 is a memory for storing the music title data of the songs of music accompaniment play stored in the CD-I 2, as for all of the CD-Gs 4, at the time of installation of the music accompaniment playing apparatus. As the memory 23, for example, a semiconductor memory, such as a DRAM (Dynamic-RAM), may be used. Assuming that the music titles for 3,000 musics are to be stored, about 120 K bytes of memory capacity is required. Namely, in case of 3,000 songs, it becomes 2 bytes $\times$ 20 character $\times$ 3,000 musics = 120,000 bytes as 20 characters are reserved per song. In addition to this, considering the data volume required to direct the address (the position and the track number on the disc) of the program of each disc, the memory 23 can be realized by use of a 256-K bytes DRAM on the whole. The origin of storing the music title data and the addresses, which are to be stored to the memory 23, is the CD-I 2.

The main operation of the present embodiment will be explained in the above constitution.

Firstly, by turning on the power supply, the operation enters the install mode at the time of installation of the music accompaniment playing apparatus. Although there are various items in the operations at the time of the install mode, only the operation directly related to the present invention, will be explained here.

When it enters the install mode, the CD-I 2 is selected from the CD changer 1 under the control of the system controller 22b, and is loaded to the CD player 3. The CD player 3 is controlled to read the volume descriptor VD from the loaded CD-I 2. The RF signal of the music title information read by the pickup 6, is demodulated by the reproducing unit 7, decoded through the CD-I data processing unit 10, and is taken into the system controller 22b as the music title information i. The system controller 22b writes the inputted music title information i to the memory 23. The installing operation as for the music title information is completed up to this point.

Nextly, at the time of the normal music accompaniment playing reproduction operation, when the music selecting command is given to the system controller 22b from the commander 21, the system controller 22b supplies the required control signal to each unit according to the given command. Namely, the system controller 22b controls the exchanging operation of the selected disc by the driving unit 24, the reproduction operations by the CD player 3 and the LD player 14, and so on. These series of operations are same as in the case of the conventional CD-G type music accompaniment playing apparatus.

However, according to the present invention, before beginning the reproduction of the CD player 3 and the LD player 14, the system controller 22b reads the music title information of the musics of music accompaniment play corresponding to the selected CD-G 4, from the memory 23, and the system controller 22b sends the music title information j to the superimposer 19 to display the information 3 on the display device 20. As a result, it brings such an advantageous effect that the title of the music of music accompaniment play to be reproduced from now, can be recognized, and thus, an unnecessary selection and a selection by mistake, can be checked before actually reproducing them. After checking the music title, it enters the reproduction mode in succession, as long as no cancellation command is given.

In the above mentioned explanation, the music title information j is transmitted to the display device 20 through the superimposer 19. However, it may be directly supplied to the display device 20. Therefore, the display device 20 in this case, may be a TV monitor set at the vicinity of the operator, independently from a TV monitor set at the audience seats, wherein the music title information 3 may be supplied only to this operator's TV monitor.

Moreover, although the above mentioned explanation is made as for the case where there is only a single CD-I 2 disc, the number of the CD-I may be two or more as occasion demands. As an example of such an occasion, there is an occasion where the existing CD-Gs are successively converted to the CD-I little by little, or an occasion where many discs are contained in one CD changer, so that the music title information are distributed to two or more CD-Is.

As described above, according to the second embodiment of the present invention, the program information name in each first format disc is recorded in the second format disc. At the time of installing the disc player etc., the program information name is transferred from the second format disc to the memory to store it. Prior to the reproduction of each CD-G, the program information name of each CD-G of the reproduction object, is displayed. Thus, there is no necessity to exchange whole first format discs. The program information name with respect to all discs can be displayed beforehand, just by preparing the second format disc or discs, which number is limited to the minimum degrees, according to the second embodiment of the present invention.

Nextly, third to fifth embodiments of the present invention will be explained.

Each of the third to fifth embodiments is constituted such that it displays the title name of the music accompaniment play in a preliminary announcement manner, for example, at the timing just before the reproduction end of the music which is reproduced in precedence, by use of the "information in the disc", in a music accompaniment playing apparatus using a plurality of discs including CD-I, in case of displaying the title name of the music to be reproduced on a picture plane of a monitor. In this case, the "information in the disc" used for the standard clock generation of the clock means to count the image display timing of the title name, differs depending upon the models of discs, and, according to it, the constitution of the music accompaniment playing apparatus differs slightly. Thus, hereinbelow, the explanation of the music accompaniment playing apparatus will be explained corresponding to the modes of combination of the discs. As the mode of the combination of the discs, it is divided roughly into the following three categories.

(1) The mode in which the discs in the CD changer 1 are constituted of a large number of the CD-Gs and a small number of CD-Is.

(2) The mode in which all of the discs in the CD changer 1 are constituted of the CD-Is.

(3) The mode in which the discs in the CD-changer 1 are random mixture of the CD-Gs and the CD-Is.

Third Embodiment

Figure 5:
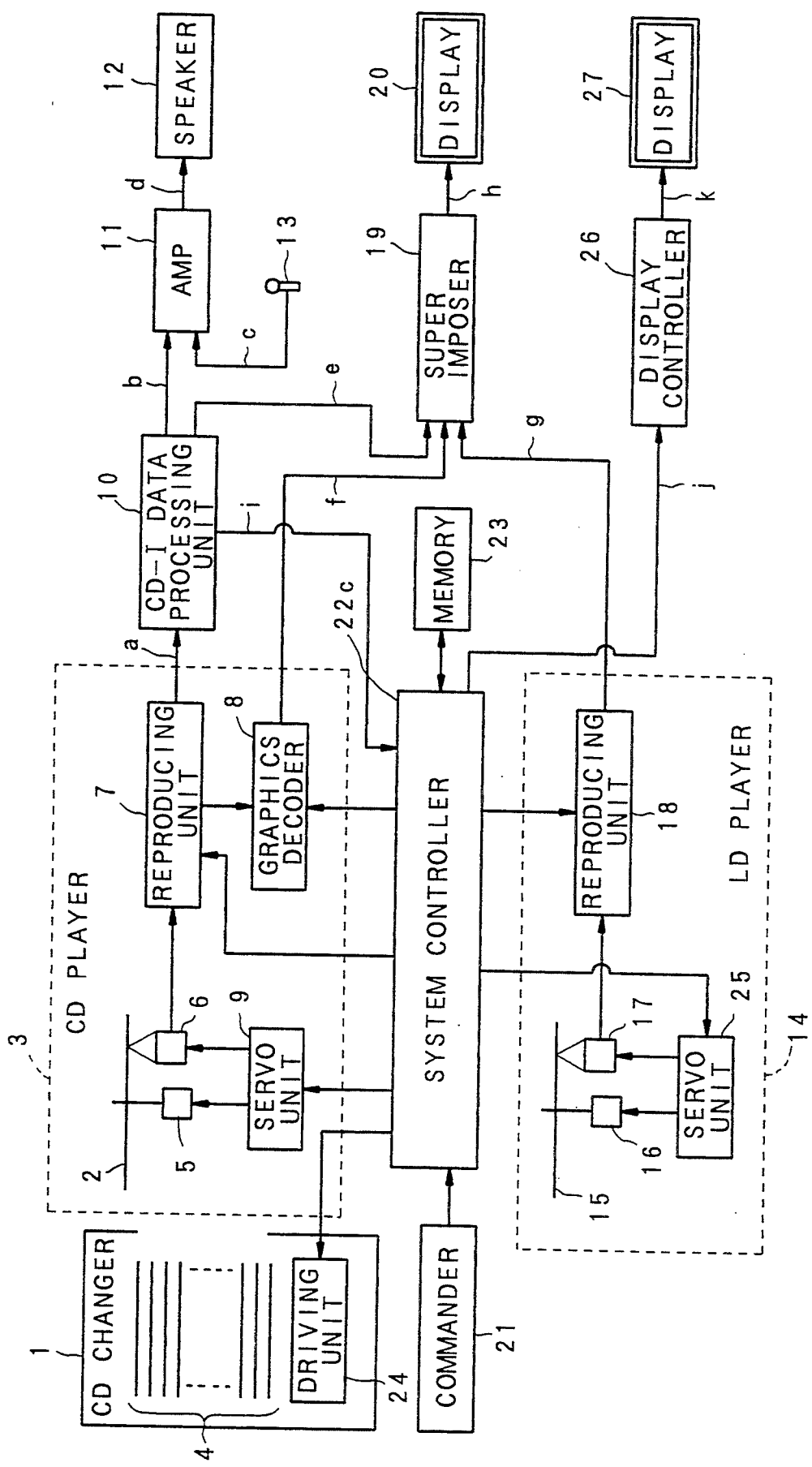
FIG. 5 is a block diagram which shows a constitution of a disc player as a third embodiment of the present invention.

FIG. 5 shows a third embodiment of the present invention. The third embodiment is an example of the music accompaniment playing apparatus in the case that the disc constitution is the above mentioned (1) mode.

In FIG. 5, the same constitutional elements as those in FIG. 1 and FIG. 4, carry the same reference numerals, and the detailed explanations thereof are omitted. The third embodiment is provided with a graphics decoder 8, a system controller 22c, a display controller 26, and a display device 27.

In FIG. 5, the CD changer 1 accommodates a plurality of discs, and is constituted so that it selectively load each disc to the CD player 3 one by one by the driving unit 24, according to an exchange command.

There are accommodated in the CD changer 1, 300 discs in total, including, for example, 299 discs of CD-Gs 4 as an existing type disc, and just 1 disc of CD-I 2 as a newly added/changed disc.

The examples of the format of each disc, are shown in FIG. 3, as aforementioned.

The CD-G 4 has such a format by which the word data, which consists of the graphics data, is recorded in the sub code area (R—W) of each frame (not illustrated), other than the audio data, which is recorded in the program information area.

The format of the CD-I 2 is prescribed on the basis of the CD-ROM, which details are prescribed according to the mode 2 of the CD-ROM. Unlike the CD-ROM, the CD-I 2 is not restricted about the kind of data recorded in the data area, so that it is possible to record the character data etc. other than the audio data to it. There is a CD-I Ready as a modification of the CD-I. As shown in the format 100b of FIG. 3, the CD-I Ready has the CD-I area and the FILE TOC area through the gap area between the TOC area and the TNO1. The VD information is prepared in the CD-I area, and is the description word which appropriately expresses and describes the contents of the information stored in the disc. The information about all of the CD-Gs 4 accommodated in the CD changer 1 and the "title" and the address (the position and the track number on the disc) of the music of the music accompaniment play, which are recorded in the program area in each CD-G 4, are recorded in the FILE TOC area, which is prepared as the application.

The format of CD-I 2 is defined by two formats of form 1, 2, such that a sub-header (8 bytes) is arranged next to the header portion of each format. File number (File No.) S0, channel number (Channel No.) S1, sub-mode (Sub mode) S2, and coding information (Coding information) S3 are recorded in the sub-header, as shown in FIG. 6. Data of these S0 to S3 are recorded twice in a repeated manner. Repeating twice is for the countermeasure against the reading error.

Among these, as shown in FIG. 6, the sub-mode S2 (a total of 8 bits) includes a flag bit, which indicates the attribute of the pertinent block i.e. distinguishing audio data or video data, distinguishing form 1 or form 2 and so on. One bit code called as a "trigger bit" (Trigger bit), is recorded in the sub-mode S2. This trigger bit is built up once at the interval of 1/75 seconds. Thus, it is possible to utilize this trigger bit as a standard clock in a cycle of 1/75 seconds, and it is also possible to constitute a clock means by counting this standard clock by a software counter set in the CPU in the system controller 22c. This point will be explained later in detail in the section of the image display controlling operation of the "title name".

On the other hand, as shown in the format 100c of FIG. 3, as one form of the CD-I, for example, the TNO1 may be used as the CD-I track, and the TNO 2 and the tracks thereafter may be used as the CD-DA tracks.

Both of the above CD-DA (CD-G) and the CD-I Ready have the TOC (Table of Contents) area. The flag bit, which indicates the kind of the disc (i.e. distinguishing CD-DA (CD-G) or CD-I) is stored in this predetermined position in this TOC area, so that the kind of the disc can be identified by this bit. The reproduction mode of the music accompaniment playing apparatus differs according to the result of reading this bit. Moreover, in the TOC, the address data in the musical movement is included as the address of the music of the music accompaniment play, so that this time information can be also used by the clock means in the same manner as the trigger bit of the CD-I. This point will be also mentioned later in the section of the image display controlling operation of the "title name".

Again, in FIG. 5, the CD player 3 reproduces the record information of the CD-G 4 or the CD-I 2 selected from the CD changer 1. Namely, for example, under the predetermined rotation by the spindle motor 5, the loaded CD-I 2 is optically read by the pickup 6. The RF signal converted into the electric signal by the pickup 6, is demodulated in the reproducing unit 7. The servo unit 9 performs the number of rotation control of the spindle motor 5, the focusing control and the tracking control of the pickup 6 and so on. Since the graphics data is included in the record information in case that the disc of reading object is the CD-G 4, the graphics decoder 8 is an apparatus for decoding the graphics data, and outputting the graphics data f as a result of decoding. The CD-I data processing unit 10 is connected to the output of the reproducing unit 7.

If the disc of the reading object is the CD-I 2, the CD-I data processing unit 10 outputs the peculiar data i.e. the title name data e and i of the music of music accompaniment play, for example, which are stored in the FILE TOC area. Even if the disc of the reading object is either the CD-G 4 or the CD-I 2, the CD-I data processing unit 10 extracts the audio signal, and sends the audio signal b to the amplifier 11. The example of the detailed constitution of the CD-I data processing unit 10 is shown in FIG. 2, as aforementioned.

The amplifier 11 combines the voice signal c from the microphone 13, and the audio signal b from the CD-I data processing unit 10, amplifies it to a predetermined power level, and outputs the composite signal d to the speaker 12.

The LD player 14 is an apparatus for supplying the BGV which runs short in the CD-G 4. The servo unit 25 controls the spindle motor 16 and the pickup 17 as well as the servo unit 9. These servo units 9 and 25 are subjected to the control by the system controller 22c.

The above title name data e from the CD-I data processing unit 10, the graphics data f from the graphics decoder 8 and the BGV data g from the reproducing unit 18, are inputted into the superimposer 19. The superimposer 19 superimposes these character information onto the BGV data g, generates the video signal h, and outputs it to the display device 20. The display device 20 displays thus given video signal h on the picture screen thereof. There are examples such as the display mode, that the graphics data f (words) is combined on the BGV, the title data e is overlapped on the BGV, and the title data e is superimposed on the background BGV of one color.

The system controller 22c performs the system control of the music accompaniment playing apparatus including the CD player 3 and the LD player 14. Namely, the system controller 22c receives the command from the commander 21, and, according to the command, supplies various control signals to each of the required unit. The memory 23 is connected to the system controller 22c.

The memory 23 is a memory for storing the title name data of the music of music accompaniment play with respect to all of the CD-Gs 4, which is stored in the CD-I 2, at the time of installing the music accompaniment playing apparatus.

The main operation of the apparatus will be explained in the above constitution.

Firstly, at the time of installing the music accompaniment playing apparatus, the operation enters an install mode, upon turning on a power supply. Though there are various items in the operation at the time of the install mode, only the operations directly related to the present invention, will be explained here.

When it enters an install mode, under the control of the system controller 22c, the CD-I 2 is selected from the CD changer 1, and is loaded to the CD player 3. The CD player 3 is controlled to read the FILE TOC from the CD-I 2 which is loaded. The RF signal of the title name data read by the pickup 6, is demodulated in the reproducing unit 7, is decoded through the CD-I data processing unit 10, and is taken into the system controller 22c as the title name data. The system controller 22c writes the inputted file name data i into the memory 23. The installing operation about the title name data is completed up to this point.

Nextly, at the time of the usual reproducing operation of the music accompaniment play, when the music selecting command is given to the system controller 22c by the commander 21, the system controller 22c gives a required control signal to each unit according to this command. Namely, the system controller 22c controls the exchanging operation of the selected discs with respect to the driving unit 24, and the reproducing operation of the CD player 3 and the LD player 14, and so on.

Now, it is assumed that a certain CD-G 4 is being reproduced. At this time, the system controller 22c calculates the ending time of the reproduced music of the CD-G 4 on the basis of the absolute time data (or progress time data) which is read from the TOC of the CD-G 4. The system controller 22c, reads out the "title name" data of the music of the music accompaniment play, which is to be nextly reproduced, from the memory 23, by the timing at a predetermined time before the ending time. The system controller 22c gives the title name data j to the display controller 26, which sends the video signal k to the display device 27, so that the display device 20 displays in the preliminary announcement manner the "title name" of the music to be nextly reproduced. Alternatively, the system controller 22c may be constituted such that the controller 22c sends the title data e to the superimposer 19 from the CD-I data processing unit 10, and superimposes it onto the BGV on the display device 20 of the music which is being reproduced. The above explained displaying operation is controlled on the basis of the absolute time data (or the progress time data) in the TOC of each CD-G 4, with respect to each CD-G 4 to be reproduced.

On the other hand, if the disc related to the reproduction is the CD-I 2, the "trigger bit" in the sub-mode S2 of the sub-header is used as the standard clock. By counting this standard clock by the software counter of the CPU in the system controller 22c, the system controller 22c reads the "title name" of the music of music accompaniment play, which is to be nextly reproduced, from the memory 23 in the same manner, and displays the title name of the next music at the predetermined time before the reproduction end of the music under the present reproduction.

In this manner, irrespective of the kind of the disc to be reproduced, the preliminary-announcement display "title name" of the music to be nextly reproduced, can be performed on the picture screen of the display device 20 or the display device 27 at the predetermined time before the end of the music under the present reproduction.

Fourth Embodiment

This fourth embodiment is the example of the music accompaniment playing apparatus in case where the disc constitution is the aforementioned (2) mode.

Since the basic constitution of the music accompaniment playing apparatus is the same as that of the third embodiment of FIG. 5, the explanation thereof is omitted.

The characteristic feature of the fourth embodiment is the point that the control of the display timing of the "title name" of the next music is performed by counting the above mentioned "trigger bit". This counting operation is realized by the software counter of the CPU in the system controller 22c, and the display timing etc. thereof, is the same as that of the third embodiment.

Fifth Embodiment

This third embodiment is the example of the music accompaniment playing apparatus in case that the disc constitution is the aforementioned (3) mode.

Since the basic constitution of the music accompaniment playing apparatus is the same as that of the third embodiment of FIG. 5, the explanation thereof is omitted.

The characteristic feature of the fifth embodiment is the point that the control of the display timing of the "title name" of the next music is performed by the absolute time data in the TOC if the disc is the CD-G 4, and the control is performed by the "trigger bits" if the disc is the CD-I, so that both operations can be performed and that the operations can be automatically switched over in accordance with the kind of the disc. The discrimination of the disc is performed by referring to the discrimination bit in the TOC.

In addition, in the above mentioned explanation, although the title name data e is transmitted to the display device 20 through the superimposer 19, it may be directly supplied to the display device 27 through the display controller 26. Moreover, the display device 27 in this case may be the TV monitor, which is, for example, set at the vicinity of the operator, and is different form the TV monitor set at the seat for the audience. The title name data may be supplied only to the operator's TV monitor in this case.

As explained above, according to the third to fifth embodiments of the present invention, since the information title name of other program information to be nextly reproduced after one program information at the specified time during the reproduction of one program information, is displayed on the display device, the information title name of the program information to be nextly reproduced can be announced beforehand.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing information of a disc player accommodating a plurality of first format discs, each of said first format discs storing program information by a first format, and accommodating at least one second format disc, said second format disc storing program information name data of each of the first format discs by a second format different from the first format, and reproducing the program information, said method comprising the steps of:

reading the program information name data from the second format disc and storing the program information name data into a memory;

selecting one of the first format discs to be reproduced; and displaying the program information name data corresponding to a selected first format disc before reproducing the program information of the selected first format disc.

2. A method according to claim 1, wherein said disc player comprises a music accompaniment playing apparatus, and a title of music to be reproduced is displayed in the displaying step.

3. A method according to claim 1, wherein said first format disc comprises a CD-G, and said second format disc comprises a CD-I.

4. A disc player comprising:

a plurality of first format discs, each of said first format discs storing program information by a first format;

at least one second format disc, said second format disc storing program information name data of each of the first format discs by a second format different from the first format;

a reproducing unit for selecting one of the first format discs and reproducing the program information of a selected first format disc;

a memory for storing the program information name data;

a displaying means for displaying a program information name; and a controlling means for reading the program information name data from the second format disc, a means for storing said information name data to said memory, and a means for transferring the program information name data corresponding to the selected first format disc to said displaying means before said reproducing unit reproduces the program information of the selected first format disc.

5. A disc player according to claim 4, wherein said second format disc comprises a disc having a data area for storing the program information name data on an inner circumferential side of an area corresponding to a first program area of said first format disc.

6. A disc player according to claim 4, further comprising a disc changer for accommodating said first and second format discs and selectively supplying one of the first and second format discs to said reproducing unit.

7. A disc player according to claim 4, further comprising:

an LD player for reproducing video data from an LD disc; and a superimposer for superimposing the program information name data onto the video data, said displaying means displaying the superimposed data.

* * * * *